United States Patent [19]
Black

[11] 3,771,227
[45] Nov. 13, 1973

[54] DENTAL CARE DEMONSTRATION DEVICE
[76] Inventor: La Donna Jeanne Black, P. O. Box 3375, Portland, Oreg. 97208
[22] Filed: June 19, 1972
[21] Appl. No.: 264,076

[52] U.S. Cl. .................................................... 32/71
[51] Int. Cl. ............................................ A61c 19/00
[58] Field of Search ......................................... 32/71

[56] References Cited
UNITED STATES PATENTS
3,458,936   8/1969   Schulz et al. ........................... 32/71

Primary Examiner—Louis G. Mancene
Assistant Examiner—J. O. Lever
Attorney—Eugene M. Eckelman

[57] ABSTRACT

A demonstration device employing a base on which is supported three pedestals each having a ball-like enlargement thereon. Supported on the base around each of the pedestals is a resilient pad which represents gum areas of the mouth, and mounted on the pedestals between the resilient pads and the enlargements are resilient layers or discs of material which at one enlargement represent an unattached gum portion at a tooth and at the other two enlargements represent a foreign substance which has gathered on the tooth such as plaque. One of the enlargements is provided with a band having a roughened surface at about the upper termination of the layer of resilient material for demonstrating the accumulation of tartar. The layer of material which is used to demonstrate the unattached gum portion is of different color than the other two layers of material. One of the enlargements has a roughened surface of a structure arranged to simulate in sound the sound of a clean tooth when rubbed with unwaxed dental floss.

10 Claims, 2 Drawing Figures

PATENTED NOV 13 1973　　3,771,227

DENTAL CARE DEMONSTRATION DEVICE

BACKGROUND OF THE INVENTION

This invention relates to a new and novel demonstration device for illustrating proper dental care.

As is well known, proper dental care by the individual provides much healthier teeth and gums. Such care goes considerably beyond the normal brushing since brushing does not clean all the areas such as those areas between the teeth. More particularly, the tip of the gum, known as the gingival margin, is unattached to the teeth. This margin extends completely around the teeth and it is difficult to remove plaque which has accumulated therein and particularly in those areas between the teeth. The majority of persons are unaware of tooth and gum structure and even more so are unaware of a proper way to clean the difficult to get at areas, particularly the gingival margin where plaque can live and breed.

SUMMARY OF THE INVENTION

A primary objective of the present invention therefore is to provide a dental care demonstration device which can be used to illustrate tooth and gum structure and to illustrate steps in proper care of the teeth and gums.

Another object of the present invention is to provide a dental care demonstration device having one or more enlargements associated with an adjacent resilient layer of material illustrating the association of teeth and gums so that a demonstrator can show the manner in which the teeth and gum areas can be properly cleaned.

Another object is to provide a dental care demonstration device of the type described which employs a plurality of enlargements in side by side engagement and associated with a resilient layer of material thereunder whereby to show the association of a tooth with a gum area and also to show the manner in which plaque and tartar can accumulate and the manner in which plaque can be removed.

Still another object is to provide a dental care demonstration device utilizing at least three enlargements disposed in abutting engagement and having contoured surfaces to represent contoured tooth surfaces and arranged to illustrate the proper usage of dental floss between the enlargements for proper tooth care, it also being an object to provide such enlargements of a spherical construction which while having contoured surfaces capable of demonstrating proper tooth care nevertheless have a pleasant appearance.

Still another object is to provide a dental care demonstration device utilizing a plurality of enlargements which illustrate adjacent teeth, one of the enlargements having a covering or surface of selected structure which simulates in sound the sound of an actual plaque-free tooth surface when rubbed by unwaxed dental floss.

Yet another object is to provide a dental care demonstration device employing means for illustrating proper tooth and gum care and including in combination therewith holder means for containing supplies to be used in the demonstration.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
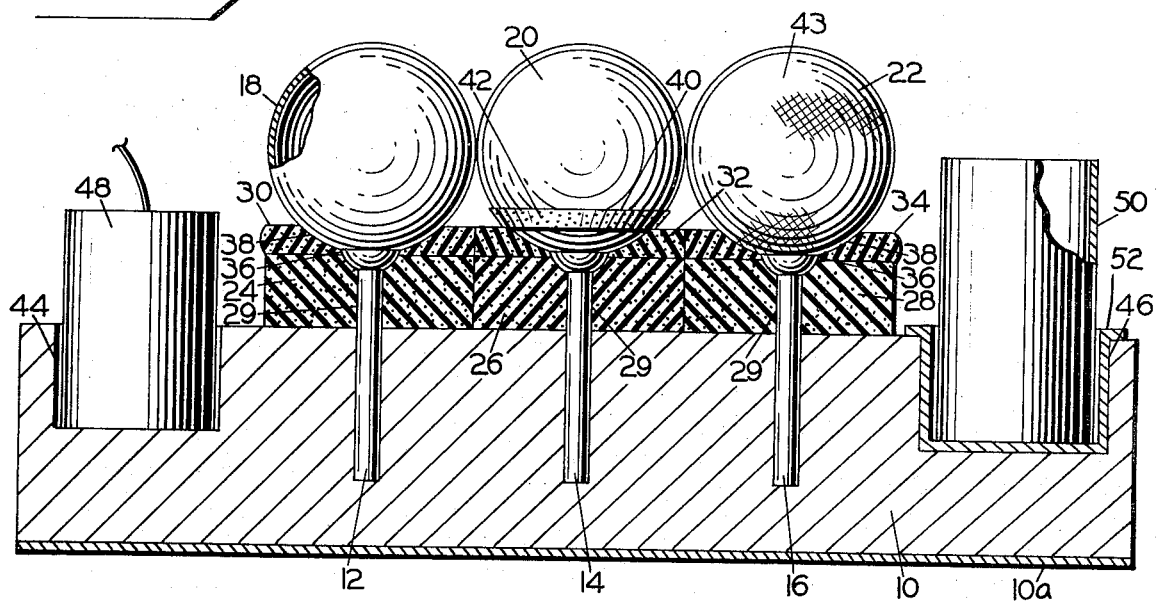
FIG. 1 is a longitudinal sectional view through a dental care demonstration device employing principles of the present invention.
Figure 2:
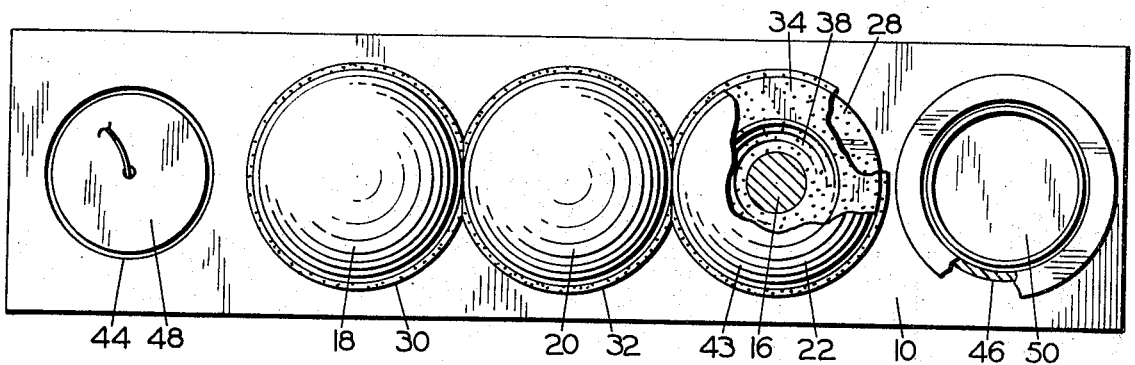
FIG. 2 is a top plan view of such demonstration device, a portion of this view being broken away.

Referring in particular to the drawings, the numeral 10 designates a base for the invention which preferably is constructed of a solid piece of wood or plastic or the like or one which has sufficient weight to provide substantial stability on a supporting surface. A layer 10a of friction material is attached to the bottom of the base 10 and serves to anchor the base on a supporting surface as well as to prevent damage to such supporting surface. The base 10 supports integrally three pedestals 12, 14 and 16 extending from its upper surface. These pedestals in turn integrally support spherical enlargements 18, 20 and 22, respectively, in a straight line, and the arrangement is such that the enlargements are in abutting engagement similar to regular tooth structure. The enlargements 18, 20 and 22 are supported rigidly in place but these enlargements and pedestals have sufficient flexibility, as in tooth structure, such that dental floss can be forced down between them. The enlargements preferably are spherical in shape to provide a pleasing appearance. This spherical shape provides space therebetween at their lower portions as in real tooth structure and facilitates the association with other structure to be described to demonstrate association with gum areas and foreign substance which may gather on the teeth.

Supported on the base 10 around the pedestals 12, 14 and 16 are pad members 24, 26 and 28, respectively, these pad members having suitable bores or holes 29 to receive the pedestals. The pad members are intended to represent the main gum or gingival portion which is associated with the teeth. Preferably, pad members 24, 26 and 28 are constructed of a resilient or spongy material to have somewhat the feel of real gum tissue.

Seated on the pad members 24, 26 and 28 are disc members or layers of material 30, 32 and 34, respectively, these disc members having suitable bores or holes 36 to receive the pedestals. The disc members are also constructed of a resilient or spongy material to have the feel of real gum tissue. The disc members 30 and 32 are of a common color and both represent plaque and the disc member 34 is of a different color and represents an unattached gum portion or gingival margin. It is desired that the disc members project upwardly beyond the bottom of the enlargements, and for this purpose counterbores 38 are provided at the upper end of bores 36 are receiving the lower portion of the enlargements.

The center enlargement 20 has a horizontal strip or band 40 therearound disposed just above the top of disc member 32. The strip 40 has a roughened surface 42 such as a sand paper surface for a purpose to be described. Enlargement 22 is covered with netting 43 or is otherwise roughened in a construction such that when rubbed with unwaxed dental floss a squeaky sound will occur similar to the sound which occurs when a clean tooth is rubbed by unwaxed dental floss.

Disposed at opposite ends of the base 10 are pockets 44 and 46 for holding articles such as a dental floss dispenser 48 shown seated in the pocket 44 and a container 50 for other equipment such as tools, toothbrushes, and the like shown seated in pocket 46. preferably, the pocket 46 has a removable metal liner 52 which receives the container 50.

In a dental care demonstration using the present device, the enlargements 18, 20 and 22, as stated hereinbefore, can be compared to tooth portions. Pad portions 24, 26 and 28 can be compared to gum tissue. Dental floss can be forced between the enlargements to show a proper manner of cleaning teeth. The disc members 30 and 32 are of a common color and can be explained as plaque. Disc member 34 is of a different color as stated so that such disc member in an initial portion of the demonstration can be explained as comprising a gum area which contains the unattached gum portion or gingival margin. That is, by pulling the disc member 34 away from the enlargement 22 by a finger or by a tool, it can be illustrated that the gingival margin is unattached around the tooth and such area can be kept clean by proper use of a toothbrush, dental floss, or other equipment.

The disc member 30 associated with the first enlargement 18 represents plaque for purposes of demonstration and it is preferred that this disc member be constructed of a synthetic foam material or the like which by feel is somewhat spongy and sticky to provide a lifelike feel of plaque. The disc member 32 is identical to disc member 30 in its color and its representation since it also is intended to illustrate plaque. The disc member 32, however, is used in combination with the horizontal strip or band 40 having the roughened surface 42 to illustrate tartar in combination with plaque. The disc members 30 and 32 and the strip 40 illustrate the usual place of accumulation of plaque and tartar and can be so demonstrated. The covering 43 on the enlargement 22 can be engaged by unwaxed dental floss to illustrate the squeak that a tooth makes when it is plaque free.

Of course, the present demonstration device may be used for any purpose in which an illustration is required for the instructive showing of tooth and gum association and means for cleaning these parts. It is to be understood that the form of my invention herein shown and described is to be taken as a preferred example of the same and that various changes in the shape, size and arrangement of parts may be resorted to without departing from the spirit of my invention or the scope of the subjoined claims. For example, the pedestals 12, 14 and 16 may comprise screw means having threaded connection to the base 10. Also, the peripheral edges of the disc members 30, 32 and 34 may be roughened or irregular to illustrate plaque.

Having thus described my invention, I claim:

1. A dental care demonstration device comprising
   a. a base,
   b. at least two enlargements supported on said base having lower contoured surfaces to represent tooth surfaces,
   c. and an individual layer of resilient material on said base for each of said enlargements, said layers being disposed around the lower portion of said enlargements with one of the layers around one of the enlargements representing a gum area of the mouth adjacent the teeth whereby and the other layer around the other enlargement representing a foreign substance such as plaque which may have gathered on the lower portion of a tooth a demonstrator is capable of illustrating proper tooth and gum care on said demonstration device.

2. The dental care demonstration device of claim 1 including
   a. a third enlargement on said base also having a contoured surface to represent a tooth surface,
   b. and a layer of material disposed between said base and said enlargement and being unattached to said enlargement to represent a gum area of the mouth and an unattached portion of the gum at the tooth.

3. A dental care demonstration device of claim 2 wherein said three enlargements are substantially spherical and are disposed in side by side touching arrangement whereby a demonstrator is capable of illustrating the use of dental floss in areas between the teeth.

4. A dental care demonstration device comprising
   a. a base,
   b. at least one pedestal on said base,
   c. an enlargement supported on said pedestal in integral relation,
   d. said enlargement having contoured surfaces representing tooth surfaces,
   e. a resilient pad on said base around said pedestal representing the gum,
   f. and a layer of material on said pad around said pedestal adjacent to said enlargement,
   g. said layer extending partly up beyond the bottom of said enlargement in overlapping relation for use in illustrating foreign substance such as plaque which may have gathered on a lower portion of a tooth.

5. The dental care demonstration device of claim 4 wherein said layer comprises resilient material to represent gum area adjacent to the tooth.

6. The dental care demonstration device of claim 4 wherein said layer comprises resilient material to represent plaque which has gathered on a tooth.

7. The dental care demonstration device of claim 4 wherein
   a. said layer comprises resilient material,
   b. and a roughened surface on said enlargement at about the upper termination of said layer to represent tarter.

8. The dental care demonstration device of claim 7 wherein said roughened surface comprises a thin band extending around the enlargement.

9. The dental care demonstration device of claim 4 including
   a. a second pedestal on said base,
   b. an enlargement supported on said second pedestal,
   c. the enlargement on the second pedestal having contoured surfaces representing tooth surfaces,
   d. a resilient pad between said base and the enlargement around the second pedestal representing a gum portion,
   e. a layer of resilient material disposed between the resilient pad and the enlargement around the second pedestal,
   f. the resilient layer of material around the second pedestal extending partly up beyond the bottom of the enlargement on the second pedestal in overlapping relation for use in demonstrating plaque which has gathered on a tooth, g. and an annular roughened surface on the enlargement on the second pedestal at about the upper termination of the pad on the second pedestal.

10. The dental care demonstration device of claim 9 including
   a. a third pedestal on said base,
   b. an enlargement supported on said third pedestal,
   c. the enlargement on the third pedestal having contoured surfaces representing tooth surfaces,
   d. a resilient pad between said base and the enlargement around the third pedestal representing a gum portion,
   e. a layer of resilient material disposed between the resilient pad and the enlargement around the third pedestal representing a gum portion,
   f. and a covering on the enlargement on the third pedestal arranged to simulate in sound the sound of an actual clean tooth when rubbed by dental floss.

* * * * *